United States Patent Office 3,469,934
Patented Sept. 30, 1969

3,469,934
METHOD OF PURIFYING CLOSED ATMOSPHERES
Joseph P. Bocard, New Albany, Ind., and Richard L. Harvin, Louisville, Ky., assignors to Girdler Corporation, Louisville, Ky., a corporation of Ohio
Filed Oct. 26, 1964, Ser. No. 406,971
Int. Cl. B01d *49/00;* B03c *3/02*
U.S. Cl. 23—4                                    8 Claims

ABSTRACT OF THE DISCLOSURE

Process and apparatus for continuously treating a closed atmosphere to render it breathable, wherein a portion of the atmosphere is continuously being withdrawn and passed through a filtering means including activated charcoal for the removal of some portion of Freon and hydrocarbonaceous contaminants. The withdrawn portion of the atmosphere is subjected to catalytic oxidation, whereby to decompose and oxidize remaining hydrocarbonaceous substances, to decompose Freon and to oxidize hydrogen. Thereafter, the withdrawn portion of the atmosphere is subjected to an absorbent solution for removing carbon dioxide therefrom, and then is cooled, filtered, and returned to the closed atmosphere.

---

This application relates to the purification of atmospheres in closed spaces such as submarines, space craft, fall-out shelters, and elsewhere as in mining or tunneling operations where the air in a confined space must be maintained in a condition suitable for breathing, but where it is impossible or impracticable to renew the air by continuous admixture with the air surrounding the earth.

Carbon dioxide may be regarded as the end product of the metabolic conversion of food by animals and human beings. It represents a loss of oxygen from the air in the closed atmosphere. The oxygen must be made up or replaced if the air is to remain suitable for breathing. While oxygen can be admitted to the regenerated atmosphere from a storage supply thereof, it is not always possible or convenient to maintain such a storage supply in connection with the space in which the atmosphere is enclosed. Oxygen can, however, be generated by the electrolysis of water; and where the atmosphere to be regenerated contains substantial quantities of hydrogen, this gas may be regarded as derived principally from an oxygen regenerating system.

It will be understood that the removal of carbon dioxide and hydrogen and the replenishment of oxygen from a suitable source is not alone sufficient to render the regenerated air pleasant for breathing. Carbon dioxide is being continuously produced by each animal organism within the closed atmosphere. Consequently, means are required for the continuous removal and concentration of the carbon dioxide. Additionally, the confined or closed atmosphere will pick up contaminants from other sources. Some $CO_2$ and $CO$ may be derived from the operation of machinery within the the closed space. Some $H_2$ may be derived, for example, from the operation of storage batteries. Hydrocarbons in mist or vaporized form may also enter the confined atmosphere from the operation of machinery. Freon in small quantities may enter the atmosphere from refrigeration systems. Various other contaminants including odoriferous substances must also be taken into account.

It is a primary object of this invention to provide a small and self-contained apparatus through which the atmosphere in the confined space can be continuously circulated and which will be effective for the removal of $CO_2$, $CO$, $H_2$, hydrocarbon impurities and other chemical and odoriferous contaminants from a closed atmosphere which must be continuously maintained in a condition for breathing.

It has hitherto been known that carbon dioxide can be effectively removed by absorption in a water solution such as one containing an ethanolamine, potassium carbonate or the like. The spent solution can be regenerated in known ways, and the carbon dioxide disposed of in any suitable manner. Mists or vapors of hydrocarbonaceous materials can be removed (but only in part) by filter-like apparatus. It has been suggested that Freon, some hydrocarbons, and other chemical constituents, sometimes of odoriferous character, may be adsorbed on activated charcoal or other suitable adsorbent materials such as molecular cells, the latter term being used to designate particulate compositions of polymer substances of large molecular sipe.

But it must be understood that adsorbent beds or structures eventually lose their effectiveness and must be replaced or regenerated. It is an object of this invention to provide a system which takes this factor into account and which provides means for the regeneration of the adsorbent substances.

Carbon monoxide, hydrogen, certain hydrocarbons and certain other chemical substances cannot effectively be removed by absorption; and it is an object of this invention to provide a means whereby these substances may be destroyed or converted to a form suitable for chemical removal.

If Freon is a contaminant of the closed atmosphere, it must be remembered that this substance upon dissociation forms a mixture of hydrochloric and hydrofluoric acids which is highly corrosive. It is an object of the invention to provide an apparatus and a method in which the necessary use of expensive, corrosion resistant alloys is minimized.

It is an object of the invention to provide an apparatus for the accomplishment of the recited functions, which is simpler, less expensive and quieter than those hitherto known.

These and other objects of the invention which will be set forth hereinafter or will be apparent to one skilled in the art upon reading these specifications are accomplished by that structure and arrangement of parts and in that procedure of which certain exemplary embodiments will now be described. Reference is made to the accompanying drawings wherein.

The invention makes use, inter alia, of a carbon dioxide removal or absorption means of known character, hereinafter referred to as a carbon dioxide scrubber, preferably of the type shown in U.S. Letters Patent No. 3,042,497. It also makes use of a means for oxidizing carbon monoxide, hydrogen, hydrocarbons and other oxidizable gaseous impurities. The conversion of these substances proceeds generally in accordance with the following reactions:

$$2CO + O_2 \rightarrow 2CO_2$$
$$2H_2 + O_2 \rightarrow 2H_2O$$
$$CH_4 + 2O_2 \rightarrow CO_2 + 2H_2O$$

The oxidizing means is hereinafter referred to as a 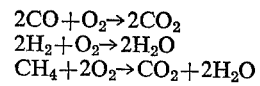$CO$—$H_2$ burner.

Figure 1:
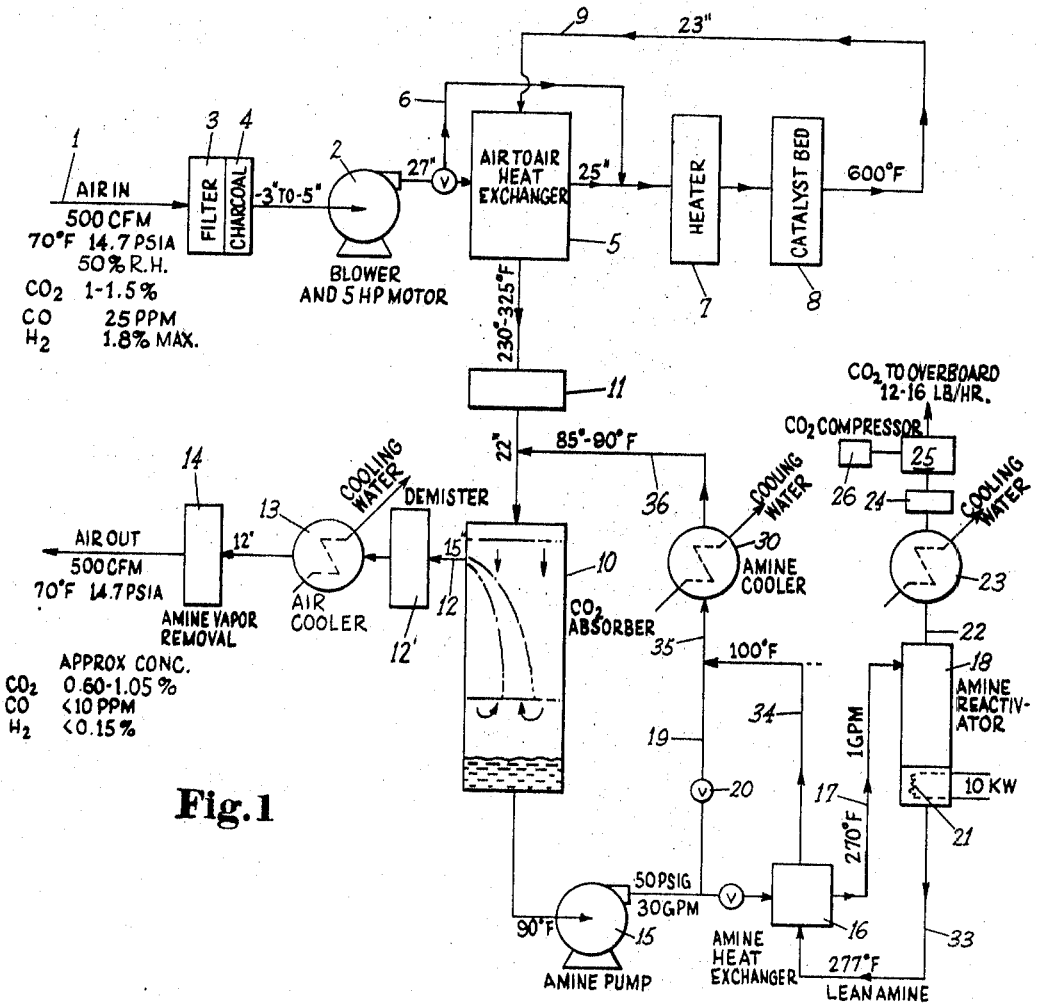
FIG. 1 is a diagrammatic flow sheet illustrative both of the apparatus and the process.

The nature of the invention will be best understood by reference to FIG. 1. The closed atmosphere enters the apparatus through the duct 1 in such quantity as to permit the treating of the entire closed atmosphere in a relatively short time. For example, but without limitation, a flow rate through the duct 1 of 500 cubic feet per minute will be found adequate for the treatment of the air in a submarine of moderate size.

The nature of the atmosphere to be treated will vary under different circumstances. Normally, because it is an atmosphere which has been used for breathing, it will be depleted as to oxygen, i.e. its oxygen content will be lower than the normal air content. It will contain a greater amount of carbon dioxide than atmospheric air, and may contain from about 1% to about 1½% of carbon dioxide. As has already been set forth it may contain other contaminants. The values hereinafter given for the effect of the apparatus and method in purifying the closed atmosphere are based on the above noted carbon dioxide content of the intake atmosphere, which also contained about 25 parts per million of carbon monoxide and up to a maximum of about 1.8% hydrogen.

The entering air may be at normal or room temperature e.g. about 70° F. at normal pressure (14.7 p.s.i.a.) and at the humidity prevailing in the submarine, and which for comfort may be around 50%. The air may be drawn into the duct by means of a blower 2, powered by, say, a five horsepower motor. Before entering the blower, the air will pass first through a filter 3 which may be a vessel containing fibrous material, ordinary wire mesh elements, felted filter paper sheets, or combinations thereof. Particulate filtering materials may also be used; and the purpose of the filter 3 is merely that of removing from the air any suspended solid or liquid material which might give trouble at a subsequent point in the apparatus.

Next the air passes through a vessel 4 containing a bed or cartridge of activated charcoal. By activated charcoal is meant a particulate charcoal which has been activated by a treatment with steam or a reducing gas. The particle size of the charcoal material may be determined by the permissible pressure drop in the air before it reaches the blower 2. A pressure drop of more than about 3" to 5" of water is not ordinarily desired. The blower also acts to increase the pressure of the air on its delivery side to a value sufficient for flow through the remaining components of the apparatus. A pressure of about 27" of water will ordinarily be found sufficient; but this does not constitute a limitation on the invention.

The activated charcoal filter 4 is effective for the removal of some Freon, some hydrocarbon contaminants, and some odoriferous constituents.

The air passes from the blower 2 through a gas-to-gas heat exchanger 5 wherein its temperature is raised. A bypass 6 around the heat exchanger is preferably provided to prevent excessive temperatures when hydrogen is present. This bypass will be provided with suitable control valves.

Next the air passes through a heater 7 (usually electric) wherein its temperature is raised above the threshold value for a catalytic oxidation reaction which takes place in a catalyst chamber 8. Oxidation of hydrogen, carbon monoxide and hydrocarbons takes place in the catalyst chamber. Any remaining Freon will also break down therein.

The most efficient temperature for the oxidation reactions will depend upon the catalyst used. Any oxidation catalyst may be employed. For example, a mixture of manganese dioxide and copper oxide (sold commercially under the trademark Hopcalite), in pellets or particles of such size and shape as to permit free flow of the gases, is an efficient oxidation catalyst having an operating temperature of the order of about 600° F. Up to about 10% by weight of lithium hydroxide, marble chips, or other material capable of neutralizing acidic compounds may be mixed with the catalyst in chamber 8.

From the catalyst chamber, the gases pass through a conduit 9 back to the heat exchanger 5 wherein they are cooled to a temperature in the range of about 230° to about 325° F. with a consequent rise in the temperature of the incoming gases. The temperature to which the oxidized gases are cooled will be such as to permit their entry into a carbon dioxide absorber tower 10. First, however, the gases are indicated as passing through a chamber 11 which will contain a charcoal charge or cartridge (such as is used in element 4) for regeneration. Thus one charcoal cartridge is in use as an adsorbent while the other is being regenerated; and the cartridges may be exchanged as often as is required.

The oxidized gases will be quench-cooled by the carbon dioxide absorbing solution to a temperature of about 90° F. in the absorber tower 10, the solution entering the top of the tower through a conduit 36. The tower will be filled with bubble plates, Raschig rings or other means insuring intimate contacts of the gases and the solution. The solution may be a water solution of potassium carbonate but is preferably a water solution of one of the ethanolamines such as monoethanolamine. The solution acts in known ways to absorb carbon dioxide. Also any acidic impurities such as hydrochloric acid or hydrofluoric acid from the break-down of Freon are neutralized by the basic absorbent. The gases are in effect washed by the absorbent solution, which also acts to remove entrained solids. The spent absorbent solution collects in a sump at the bottom of the tower, whence it is removed for regeneration as later described.

After the gases have passed through the absorber tower, they enter ductwork 12 which preferably contains mist eliminating means 12' such as wire mesh. The gases are next cooled by a heat exchange device indicated at 13. perature comfortable for human occupancy, say 70° F. or exchange device, and the gases will be reduced to a temperature comfortable for human occupancy, say 70° F. or lower. Before being released into the occupied space, the gases are preferably passed through a chamber 14 effective for the removal of amine vapors. For this purpose the chamber may be filled with activated charcoal, molecular sieve material, ion exchange resins, silica gel or mixtures thereof.

By the procedure outlined, the air withdrawn from the closed atmosphere will be purified as indicated and caused to contain carbon dioxide in the range of about 0.60 to about 1.05% with less than 10 p.p.m. of carbon monoxide and less than 0.15% hydrogen. It will be suitable for breathing upon renewal of its oxygen content, which may be accomplished in the ways first outline in these specifications. The humidity of the atmosphere may be controlled as desired.

The absorbent solution for the carbon dioxide will be continuously regenerated. For this purpose the spent absorbent solution from the sump in the tower 10 is first acted upon by a pump 15 which raises its pressure to, say, 50 p.s.i.g. at an outlet pumping rate (for the size apparatus which has been given as exemplary herein) of 30 gallons per minute. The spent absorbent solution is preferably passed through a heat exchanger 16, which may raise its temperature to about 272° F., and is thence carried by a conduit 17 to a reactivator tower 18 at a rate of about one gallon per minute. It is preferred to provide a bypass line 19 controlled by a valve or other suitable means 20 for returning some of the spent solution to the absorber tower as hereinafter set forth.

That portion of the spent solution which is carried to the reactivator tower 18 is regenerated therein in a known way. The term "spent solution" as used herein is not intended to signify that the solution is devoid of the property of absorbing carbon dioxide. On the contrary it is still in a relatively active condition, so that it is not necessary to regenerate all of it continuously. The reactivator tower 18 will be filled with bubble plates, Raschig rings, or the like, and the absorbent solution in it will collect in a sump at the bottom. Heat is applied to the solution in the sump to further the regenerative process; and in the type of apparatus being described, while this heat may be derived from steam, it will usually be derived from an electric heater 21, such as a heater using about 10 kilowatts.

The skilled worker in the art will understand that carbon dioxide will be driven from the absorbent solution and will exit from the top of the reactivator tower as at 22. The carbon dioxide stream is preferably subjected to cooling in the heat exchanger 23 wherein cold water or a refrigerating means will be employed for heat exchange purposes.

The cooling of the carbon dioxide gas stream has also the effect of condensing water vapor in it; and the resulting water is preferably removed by an entrainment separator 24 and returned to the solution in the reactivator tower to assist in maintaining its water content. The removed carbon dioxide may be disposed of in any way desired. For example, it may optionally be passed through a compressor 25 driven by a motor 26 and then released overboard if the closed atmosphere is located in a submarine. However, it may be disposed of or utilized in other ways; and the mode of disposal or utilization forms no limitation on this invention.

The combination of the carbon dioxide scrubber and of the CO—$H_2$ burner which characterizes this invention permits the elimination of one blower and motor, and produces quieter operation.

The regenerated absorbent solution from the reactivator tower 18 is delivered by a conduit 33 to the heat exchanger 16 wherein it may be cooled to a temperature of, say, around 100° F. and from which it is carried by conduit 34 to a point of juncture with the bypass conduit 19. From the point of juncture the mixture of recirculated spent absorbent solution and regenerated absorbent solution is delivered by a conduit 35 to the cooling means 30. This cooling means will normally employ cold water or refrigeration, and will insure that the absorbent solution will have a temperature no greater than about 85° to 90° F. in the conduit 36 which either enters the top of the tower 10 or joins with the conduit carrying the gases from the heat exchanger 5 to the absorber tower 10.

Should the absorbent solution pick up any substantial quantity of insoluble matter derived from the activated charcoal cartridges in chambers 4 or 11, or from the catalyst bed in chamber 8, it will be within the scope of this invention to provide suitable filtering means (not shown). Such means if employed, will usually be located in the inlet conduit to the spent solution pump 15.

Figure 2:
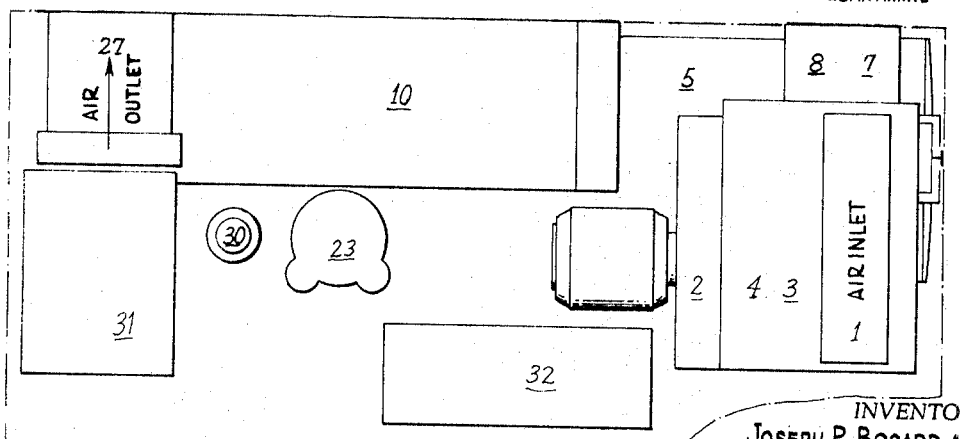
FIGS. 2, 3 and 4 are respectively a top plan view, an intermediate sectional view and a side elevation of an exemplary installation.
Figure 3:
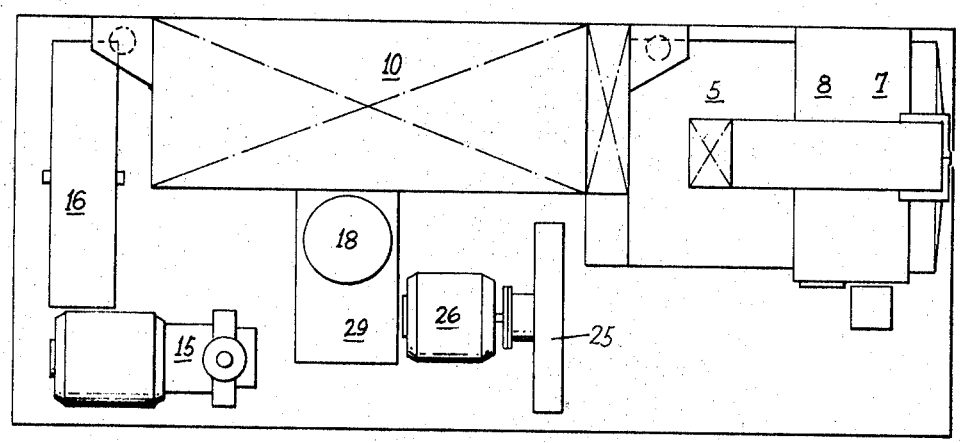
Figure 4:
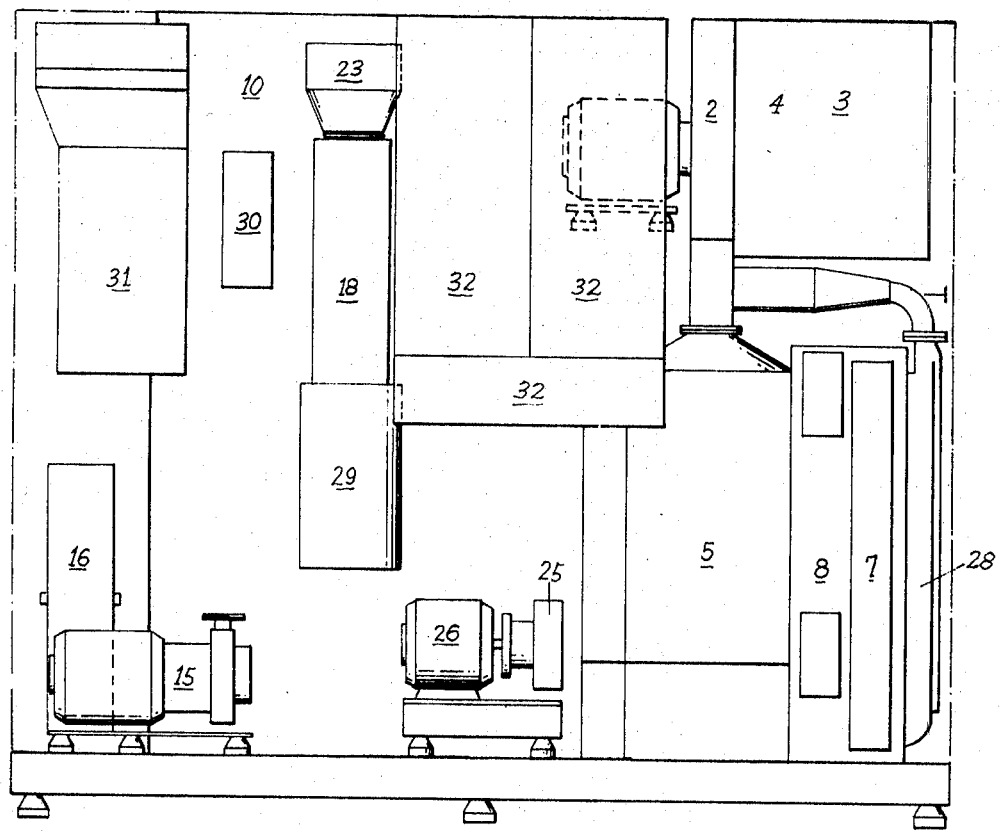

A diagrammatic representation of an apparatus assembly such as has been described in connection with FIG. 1, is shown in FIGS. 2, 3 and 4. Here like parts have been given like index numerals so that they will be readily identified. The purpose of FIG. 2 is to indicate first that the apparatus of FIG. 1 can be combined into a small self-contained unit which takes up little room in the closed atmosphere space; and second that savings both in space and in construction can be accomplished by making various units with a cross sectional shape which is essentially rectangular, or at least has a flat side. Spaced units can be connected along their edges to form various parts of the conduits or ductwork whereby savings in cost and weight are effected.

In FIG. 2 it may be noted that the air inlet is located at 1 and the air outlet at 27. The scrubber tower 10, which is one of the larger and bulkier units, is rectangular in configuration. The filter means 3 and charcoal adsorbent means 4 are located adjacent the air inlet and in a position of ready access from the top or rear of the apparatus. The first blower or compressor 2 is immediately adjacent the housing which holds the filter and charcoal adsorbent means 3, 4. The heat exchanger 5 is located immediately below the blower and in part below the elements 3 and 4. The heater 7 and catalytic oxidation means 8 are located below elements 3 and 4 and a delivery conduit means to the heater is indicated at 28 and utilizes a part of the side wall of the heater. Note that the heat exchanger 5 is located near the absorber tower 10, so that it can be connected thereto by a very short conduit which also may constitute the charcoal reactivation chamber 11.

The pump 15 for the spent absorbent solution is very close to the solution heat exchanger 16 for the solution; and the regenerator tower 18 which is substantially smaller than the absorber tower 10 is located adjacent the absorber tower. In FIG. 4 the sump portion of the reactivator tower (sometimes called the reboiler) is indicated at 29 immediately below the reactivator tower proper. The cooler for the regenerated and mixed absorbent solution is shown at 30 in a position near the absorber tower 10; and the carbon dioxide cooler is closely adjacent as at 23 in FIG. 2.

Various elements such as the conduit 12 containing the demisting material, the air cooler 13, and the amine vapor remover means 14 are shown in closely assembled relationship near the absorber tower 10 at 31.

Flexible connections such as conduits for liquid, coolant, and electrical cables have been omitted from FIGS. 2, 3 and 4 for the sake of simplicity. However, FIGS. 2 and 4 do indicate the presence of a control panel or panels at 32, upon which may be mounted meters, temperature recorders, switches, valve operating means and the like.

Modifications may be made in the invention without departing from the spirit of it.

The embodiments of the invention in which an exclusive property or privilege is claimed are defined as follows:

1. In a process for continuously treating a closed atmosphere to remove therefrom contaminants comprising excess carbon dioxide and hydrogen, carbon monoxide, hydrocarbon impurities, Freon and chemical and odoriferous contaminants, the steps of withdrawing a portion of said atmosphere, passing the withdrawn atmosphere through an activated charcoal filter to remove certain contaminants, compressing the atmosphere portion, heating it, contacting it with an oxidation catalyst, cooling it, contacting it wih a solution to absorb carbon dioxide from it, further cooling it, and again releasing it to the closed atmosphere.

2. The process claimed in claim 1 wherein the atmosphere portion after compression is brought into heat exchange relationship with the atmosphere portion after it has been subjected to said catalytic oxidation.

3. The process claimed in claim 2 wherein the catalytic oxidation is effected in the presence of a basic material suitable for the neutralization of acidic components which might arise from the decomposition of contaminants comprising Freon.

4. The process claimed in claim 3 wherein the atmosphere portion after having been subjected to catalytic oxidation and neutralization as aforesaid is passed over charcoal for the purpose of regenerating said charcoal for use in the first mentioned charcoal treatment step.

5. The process claimed in claim 4 wherein the absorbent solution is continuously recirculated and wherein a portion of the recirculated solution is reactivated by driving carbon dioxide therefrom through the use of heat.

6. In a process for continuously treating a closed atmosphere to render it breathable, the steps of passing a portion of said atmosphere continuously through filtering means including activated charcoal for the removal of some portion of Freon and hydrocarbonaceous contaminants, subjecting the atmospheric portion to catalytic oxidation whereby to decompose and oxidize remaining hydrocarbonaceous substances, to decompose Freon and to oxidize hydrogen, thereafter passing the treated atmosphere portion over a quantity of charcoal for the activating thereof, subjecting the treated atmosphere portion to an absorbent solution for removing carbon dioxide therefrom, and cooling, filtering and returning said atmosphere portion to the said closed atmosphere.

7. The process claimed in claim 6 including the step of removing from said atmosphere portion non-gaseous substances entrained therein.

8. The process claimed in claim 7 including the step of cooling and dehumidifying the said atmosphere portion before returning it to the closed atmosphere.

References Cited

UNITED STATES PATENTS

| | | | |
|---|---|---|---|
| 1,610,288 | 12/1926 | Jones et al. | 252—445 X |
| 3,179,500 | 4/1965 | Bowen et al. | 23—260 |
| 3,242,058 | 3/1966 | Ganley et al. | 23—4 X |

OSCAR R. VERTIZ, Primary Examiner

E. C. THOMAS, Assistant Examiner

U.S. Cl. X.R.

23—2, 260